United States Patent
Ardanese et al.

(10) Patent No.: US 12,220,862 B2
(45) Date of Patent: Feb. 11, 2025

(54) SHEET LAMINATION ADDITIVE MANUFACTURING FOR HOLLOW SEALED GEOMETRIES WITHOUT INTERNAL SUPPORT

(71) Applicant: GM GLOBAL TECHNOLOGY OPERATIONS LLC, Detroit, MI (US)

(72) Inventors: Raffaello Ardanese, Bloomfield Hills, MI (US); James Joseph Deininger, Sterling Heights, MI (US); Andrew Thomas Cunningham, Cambridge, MA (US); Mark Allen Leavitt, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 18/156,803

(22) Filed: Jan. 19, 2023

(65) Prior Publication Data
US 2024/0246287 A1    Jul. 25, 2024

(51) Int. Cl.
*B29C 64/147*  (2017.01)
*B29C 64/153*  (2017.01)
*B29C 64/314*  (2017.01)
*B33Y 10/00*  (2015.01)
*B33Y 30/00*  (2015.01)
*B33Y 40/10*  (2020.01)

(52) U.S. Cl.
CPC .......... *B29C 64/147* (2017.08); *B29C 64/153* (2017.08); *B29C 64/314* (2017.08); *B33Y 10/00* (2014.12); *B33Y 30/00* (2014.12); *B33Y 40/10* (2020.01)

(58) Field of Classification Search
CPC ... B29C 64/147; B29C 64/153; B29C 64/314; B33Y 10/00; B33Y 30/00; B33Y 40/10
See application file for complete search history.

(56) References Cited

U.S. PATENT DOCUMENTS

2020/0198249 A1* 6/2020 Jaster ................. B29C 39/02
2020/0368965 A1* 11/2020 Richards ............ B29C 64/147

FOREIGN PATENT DOCUMENTS

CN    112548117 A  *  3/2021  ............ B22F 3/24
DE    102020108446 A1    10/2020

* cited by examiner

*Primary Examiner* — George R Koch
(74) *Attorney, Agent, or Firm* — Lorenz & Kopf LLP

(57) ABSTRACT

Systems and methods are provided for building a product by additive manufacturing and creating hollow volumes without including build supports in the hollow volume for the layers above the hollow volume. An additive manufacturing cell includes a material handling device, a printer a material delivery system and an energy source to feed the sheets, print on the sheets, apply a powder on the printed sheets, build a hollow volume into the sheets and consolidate the sheets into a product with a contiguous structure.

20 Claims, 12 Drawing Sheets

SHEET LAMINATION ADDITIVE MANUFACTURING FOR HOLLOW SEALED GEOMETRIES WITHOUT INTERNAL SUPPORT

INTRODUCTION

The present disclosure generally relates to the manufacture of complex three-dimensional parts by additive manufacturing using sheet material, and more particularly relates to additive manufactured parts made of laminated sheets with defined hollow and sealed spaces that do not require printed build supports or post-build material removal.

Additive manufacturing or 3D printing technologies have come into widespread use due to their desirable qualities such as efficiency and flexibility. Various types of 3D printing technologies have been developed for creating objects from metal and polymer materials. The various 3D printing technologies each generally includes a build surface, a material delivery system, an energy delivery system, and a control system. The build surface provides a reference surface upon which the material is deposited, layer-by-layer, to successively build up the part according to design details. The material delivery system effects the depositing of a material, such as in a particle, fiber or filament form, for fusing with the previously deposited layer. The energy delivery system adds energy to the feedstock material before, during and/or after deposition for liquifying/fusing the material into the part being created. The control system operates each of the other systems in building the object being created, such as according to the design definition.

While additive manufacturing is expanding in use, limitations exists because voids within printed parts require build supports as the layers are built upon one another. Supports are printed into the voids to support the higher layers. In some parts the supports may remain in place. However, other products require removal of the supports, which may be challenging or impractical.

Accordingly, it is desirable to produce components and parts with internal voids/hollow volumes by additive manufacturing efficiently, without a need to remove supports or other material from the voids. In addition, it is desirable to provide processes and systems that facilitate building additive manufactured parts with voids. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for building a product by additive manufacturing and creating hollow volumes without including build supports in the hollow volume during the build. In a number of embodiments, a method includes building a product from sheets. A material handling device feeds one of the sheets into an additive manufacturing cell. A printer prints a printing material onto the fed sheet of material. A material delivery system applies, over the printing material, a powder material for securing the sheets together. The product is built-up by repeating the feeding, the printing, and the applying for the remaining sheets except for a last one of the sheets where only the feeding is repeated. During the build, a hollow volume is enclosed within the product, without supports extending through the hollow volume. The build is completed by feeding the one last sheet without the printing and the applying on it. An energy source is configured to secure, by the powder material, the sheets together to define the product as a contiguous structure.

In additional embodiments, before the feeding, design data of the product is sectioned at intervals through the product to produce a plurality of data sets. Each data set defines a section of the product, and all of the data sets define the product, in entirety.

In additional embodiments, the design data is sectioned at intervals through the product to produce the data sets, and before the feeding, the sheets are cut to match the data sets. Openings may be cut through some but not all of the sheets, and one sheet is cut for each one of the data sets.

In additional embodiments, during the build, a fluid and/or an object are inserted into the hollow volume.

In additional embodiments, the cutting and the building creates an internal frame structure from the sheets. The frame structure is built in the hollow volume.

In additional embodiments, the internal frame structure is formed from a material having a specific rigidity. An area of the sheets other than the internal frame structure is formed from another material having a different rigidity.

In additional embodiments, the consolidating includes applying energy to the product to diffuse the powder into the sheets.

In additional embodiments, the sheets are cut to match the data sets. After cutting and prior to feeding, the sheets are stacked in a build order.

In additional embodiments, during the build and prior to closing off the hollow volume with subsequent sheets, the hollow volume is lined with a sealing layer to provide isolation of the product from a fluid in the hollow volume.

In additional embodiments, the sheets are cut to form a conformable storage vessel by the build.

In a number of other embodiments, a product is built from sheets by a system that includes a material handling device that feeds the sheets, one at a time, into an additive manufacturing cell. A printer prints a printing material onto the fed sheet. A material delivery system applies a powder for securing the sheets together over the printing material. The material handling device, the printer and the material delivery system are used to build the product from the sheets, except for a last one of the sheets, where no printing material and no powder is applied. The additive manufacturing cell builds a hollow volume enclosed within the product, without including supports for the sheets extending through the hollow volume. The build is completed with a last sheet. An energy source is used to secure the sheets together by the powder to define the product as a contiguous structure.

In additional embodiments, a computer generates design data of the product at intervals to produce a plurality of data sets. Each data set defines a section of the product, and all of the data sets define the product, in entirety.

In additional embodiments, a computer is used to section design data of the product at intervals, and a cutter cuts the sheets to match the data sets including with openings through some but not all of the sheets. There is a corresponding one sheet for each one of the data sets.

In additional embodiments, a mechanism inserts, during the build, a fluid and/or an object into the hollow volume.

In additional embodiments, the additive manufacturing cell is used to build an internal frame structure from the sheets and in the hollow volume.

In additional embodiments, the internal frame structure is made of a material having a specific rigidity. An area of the sheets other than the internal frame structure is made of another material having a different rigidity.

In additional embodiments, the energy source applies energy to the product to diffuse the powder into the sheets.

In additional embodiments, a cutter cuts the sheets to match the data sets. The sheets are pre-stacked in a build order before being fed into the additive manufacturing cell.

In additional embodiments, during the building and prior to closing off the hollow volume with subsequent sheets, the hollow volume is lined with a sealing layer to provide isolation of the product from a fluid in the hollow volume.

In a number of additional embodiments, a product is built from sheets by a method that includes sectioning design data of the product at intervals to produce a plurality of data sets. Each data set defines a section of the product, and all of the data sets define the product, in entirety. Before feeding, a cutter cuts the sheets to match the data sets, including cutting openings through some but not all of the sheets. One sheet is cut for, and corresponds to, each one of the data sets. A material handling device feeds one sheet at a time into an additive manufacturing cell. A printer prints a printing material onto the fed sheet. A material delivery system applies a powder over the printing material, for securing the sheets together. The product is built by repeating the feeding, the printing, and the applying for the remaining sheets, except for a last one of the sheets where only the feeding is repeated. During the build, a hollow volume is enclosed within the product. Build supports are not provided for the sheets within the hollow volume. The build is completed by feeding the one last sheet without the printing and without applying powder, and the hollow volume is sealed closed. The built product is consolidated and the sheets are secured together via an energy source and the powder. The consolidated sheets define the product as a contiguous structure.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
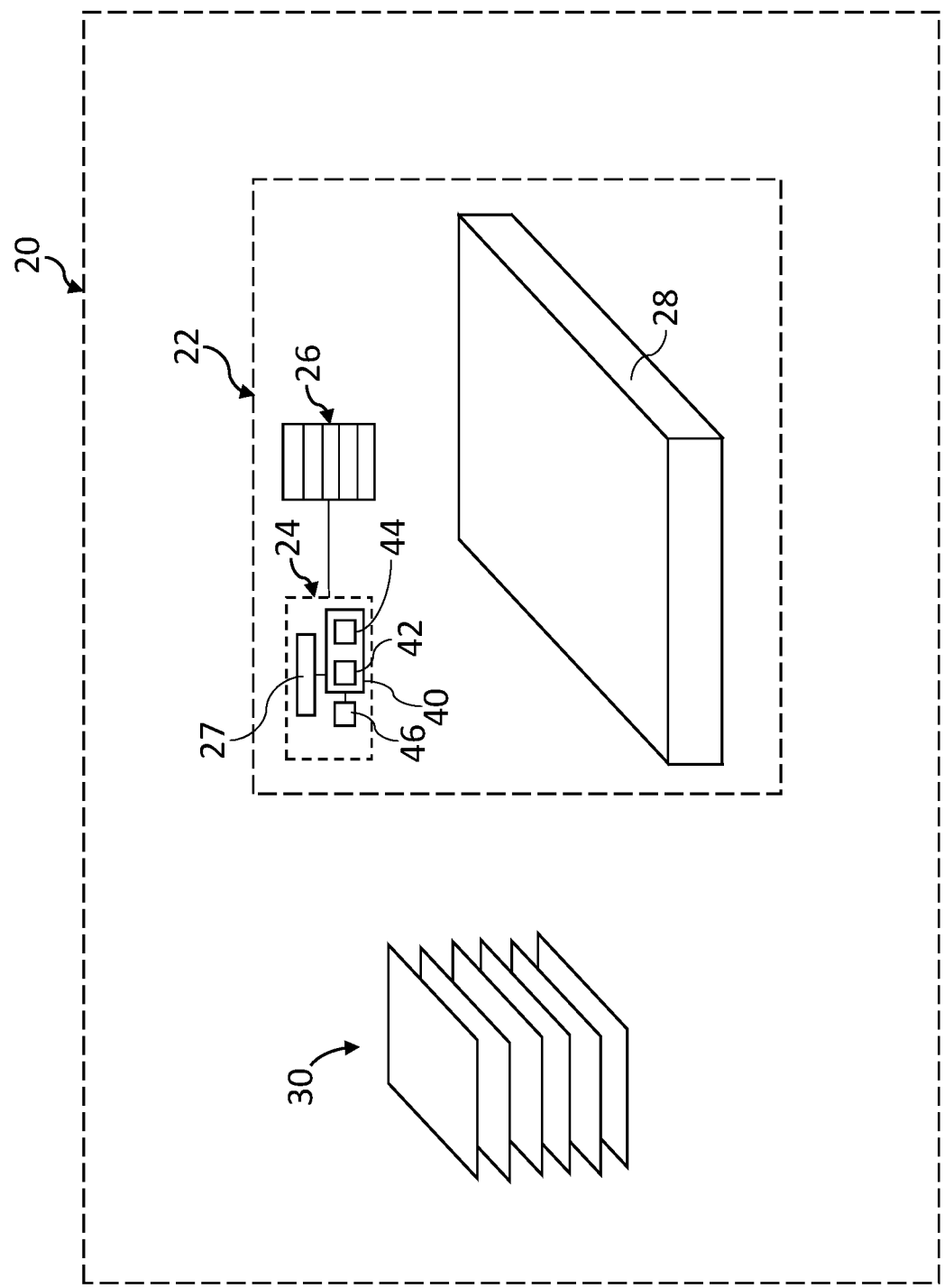
FIG. 1 is a schematic illustration of an additive manufacturing system, in accordance with various embodiments.

Referring to FIG. 1, a system 20 includes an additive manufacturing cell 22 that is schematically illustrated. In general, the system 20, which may also be referred to as a 3D printing system, includes the additive manufacturing cell, a control system 24, various actuators 26 (including as further described below), a build plate 28, and may include various other systems and devices. In the current embodiment, the additive manufacturing cell 22 is configured for lamination additive manufacturing.

The lamination additive manufacturing of the additive manufacturing cell 22 may use a sheet material as feedstock 30. The feedstock 30, along with other desired constituents may be applied to the build plate 28 to build a product layer by layer. In some embodiments, a combination of material types may be used as the feedstock 30 such as feedstock as sheets, powder, liquid, wire/cord and/or others. In some embodiments, a combination of additive manufacturing types may be used to build a product or features thereof in a hybrid arrangement with the lamination additive manufacturing.

The control system 24 may include a controller 40. The controller may include a processor 42, a memory device 44, and may include, or be coupled with, a storage device 46. While one controller 40 is shown coupled with system 20, including with the actuators 26, in one control system 24, any number of controllers may be used and may operate alone or in coordination to carry out the various functions of the system 20. Accordingly, while the components of the control system 24 are depicted as being part of the same system (control system 24), it will be appreciated that in certain embodiments, these features may comprise multiple systems and any number of individual controllers may be employed.

The controller 40 may receive information in signals from the various sensors 27, which are configured to generate signals in proportion to various physical input parameters associated with the system 20. The controller 40 processes the received information, and sends control signals/commands to the various actuator systems 26 for operation of the system 20. The controller 40 may carry out instructions, when executed by the processor 42, support the receipt and processing of signals such as from the various sensors, and may carry out the performance of logic, calculations, methods and/or algorithms for automatically controlling the components and systems and processes described herein, such as by operating the various actuator systems 26 of the system 20. During operation, the processor 42 may execute one or more programs and may use data, each of which may be accessed from the storage device 46 and as such, the processor 42 controls the general operation of the controller 40 in executing the processes described herein, such as the process 200 described further below in connection with FIG. 16, and in controlling the various systems described herein. The memory device 44 may store the above-referenced programs along with one or more stored values of the data such as for short-term data access. The storage device 46 stores data, such as for long-term data access for use in automatically controlling the system 20 and may receive the data described below. The storage device 46 may be used to store the build routine for the specification of the product being built.

In some embodiments, the build plate 28 may be coupled with one or more of the actuators 26. For example, the build plate 28 may be raised and lowered during a product build cycle. As such, the actuators 26 may include those configured to elevate the build plate 28. In some embodiments, the build plate 28 may be moveable between the additive manufacturing cell 22 and other processing cells (not illustrated).

Figure 2:
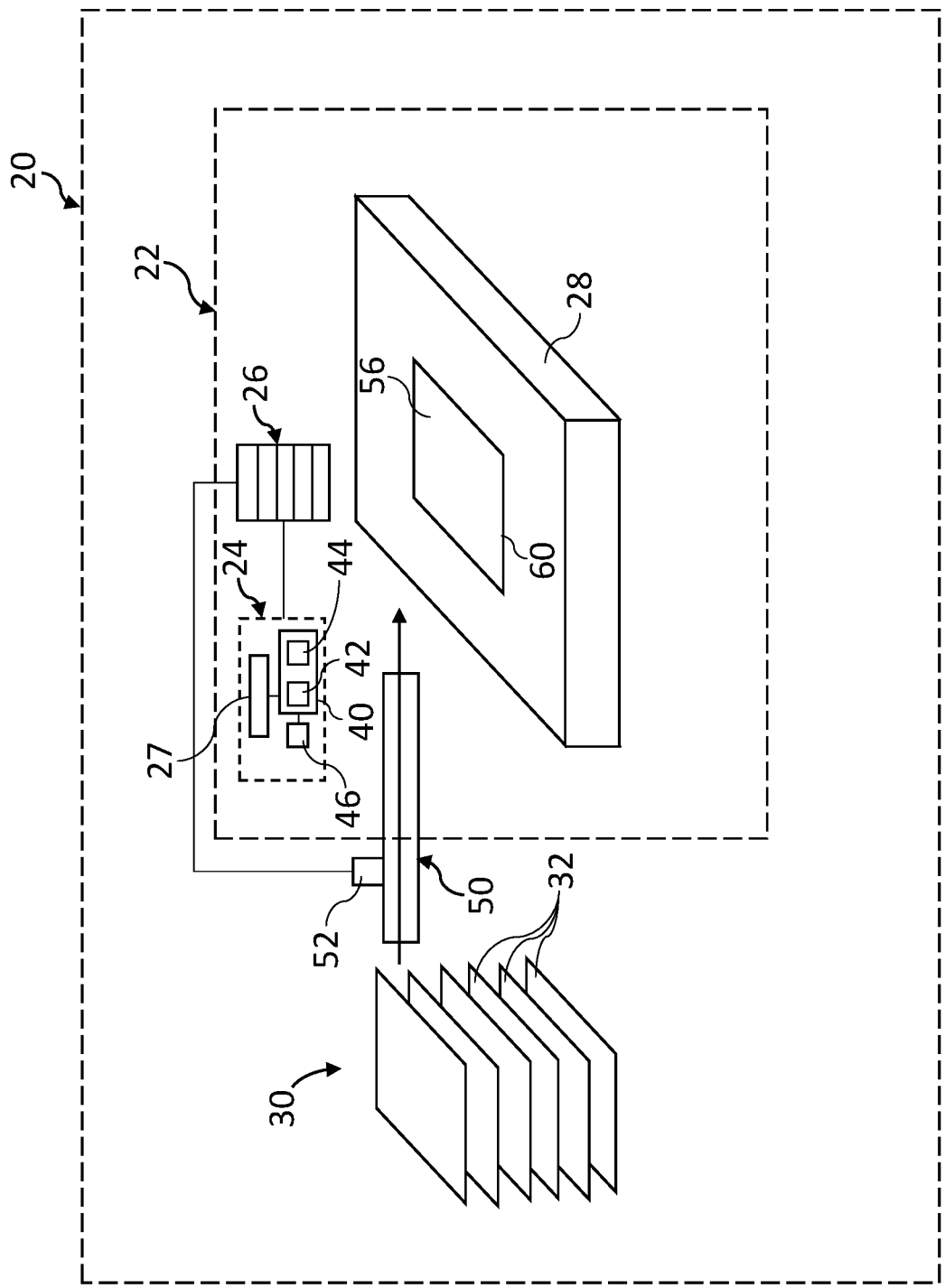
FIG. 2 is a schematic illustration of an additive manufacturing system at a feedstock receipt stage in the process of building a product, in accordance with various embodiments.

Referring to FIG. 2, the system 20 is illustrated in a feedstock receipt stage. The feedstock 30 may be delivered in sheet form via multiple sheets 32 sized to the dimensions needed for the product being built. In some embodiments, the feedstock 30 may be delivered in bulk, such as in a coil or roll, and may be cut to size as it is fed into the additive manufacturing cell 22. The feedstock may be a plastic/polymer, a composite, a fiber reinforced composite, a metal, a ceramic, a biomaterial, and/or another material specified for the product being built. A feed system 50 may be employed to automatically feed the feedstock 30 into the additive manufacturing cell 22. An actuator 52, or multiple actuators, may be employed to move the feedstock 30. The actuator(s) 52 may be part of the actuators 26. In examples, the actuator(s) may include those that operate conveyor(s), pick-and-place machines, robotic arms, and/or other material moving devices.

As shown in FIG. 2, a sheet 56 of the feedstock 30 is placed on the build plate 28 in the additive manufacturing cell 22 as the bottom sheet in the build and may have been the top sheet of the sheets 32, when pre-stacked. The sheet 56 is the first sheet for building the product 58. The sheet 56 may have a perimeter 60 shaped to net-shape of the product 58 being built and that shape is determined by the product design. While the sheet 56, and all the sheets 32 of the feedstock 30 are illustrated as quadrilaterals for simplicity, in embodiments, the outer profile of the sheets 32 may take any shape. Dies or cutters may be used to precisely cut the sheets 32 to match final geometry of the product. In this embodiment, the sheet 56, as the first/bottom sheet, is solid within its perimeter 60 with no openings. The product 58 is of a design that has a closed outer surface, at least at the bottom of the build. In some embodiments, surface openings to interior features may be provided, however, the product 58 may be oriented so that such surface openings do not extend through the first sheet 56 that is place on the build plate 28.

Figure 3:
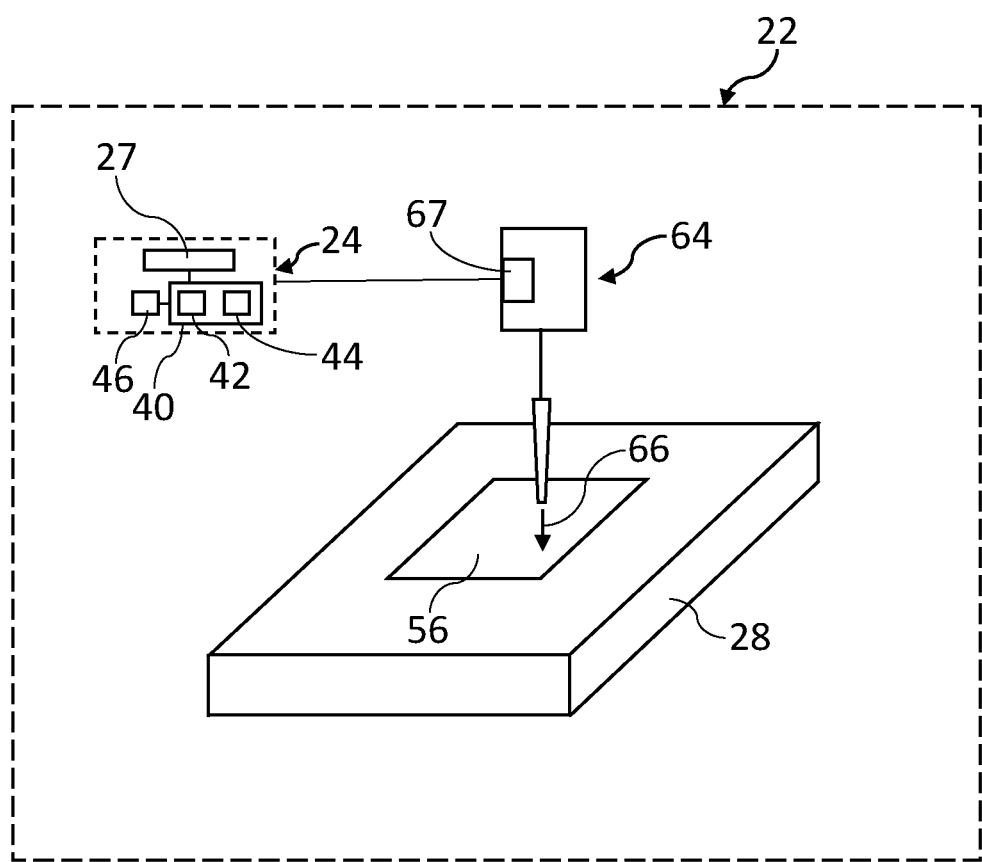
FIG. 3 is a schematic illustration of an additive manufacturing system at an inking stage in the process of building a product, in accordance with various embodiments.

Referring to FIG. 3, the system is illustrated with a jet system 64 applying a printing material 66 to the sheet 56. The printing material 66 may also be referred to as ink, and is a material, such as a clear liquid, formulated to adhere and hold a powder material on a surface, without interfering with the bonding function of the powder material. The jet system 64 may be a thermal inkjet system or another printer system and includes actuators 67, which may be part of the actuators 26. The actuators 67 may include a multi-axis positioning device and an ink delivery device such as to heat and propel the printing material 66. The controller 40, via the processor 42, operates the actuators 67 to selectively apply the printing material 66 to the sheet 56. The pattern defined on the sheet 56 by the applied printing material 66 may be retrieved from the storage device 46 and is designed to match the sheet 56 and the next layer of feedstock 30 that is placed on the sheet 56. When the sheet 32 in the next layer is free of openings, the entire surface of the sheet 56 may be covered with the printing material 66. In embodiments, a number of solid layers may be built up. In other embodiments, the next layer may include openings and the entire sheet 56 may not be covered so as to leave the areas with openings above uncovered.

Figure 4:
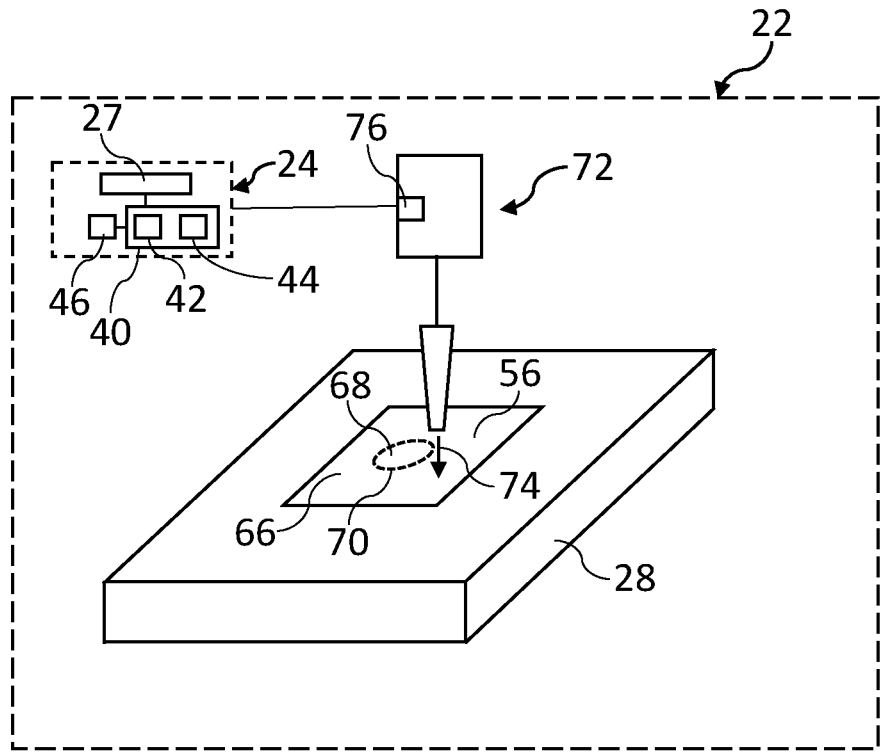
FIG. 4 is a schematic illustration of an additive manufacturing system at a powder application stage in the process of building a product, in accordance with various embodiments.

As shown in FIG. 4, the printing material 66 has been applied to the sheet 56 leaving an area 68 uncovered. The area 68 is defined by a perimeter 70 that is circular in this example, and corresponds to the shape and size of an opening in the layer that will be built on top of the sheet 56. A powder delivery system 72 is shown applying a powder 74 onto the sheet 56 over the printing material 66. The area 68 may be avoided when applying the powder 74. The powder delivery system 72 may be any system that delivers a metered amount of the powder 74, or of another material or materials. Examples include scrapers, rollers, chutes, nozzles, etc. to deliver and spread/distribute the powder 74. The powder 74 may be a polymer, a metal, a ceramic, a composite, or a combination thereof and is selected for compatibility with the material of the feedstock 30. The powder delivery system 72 includes actuators 76, which may be part of the actuators 26. The actuators 76 may include rotary actuators, linear actuators, valves, etc. The controller 40, via the processor 42, operates the actuators 76 to selectively deliver and apply the powder 74 to the sheet 56.

Figure 5:
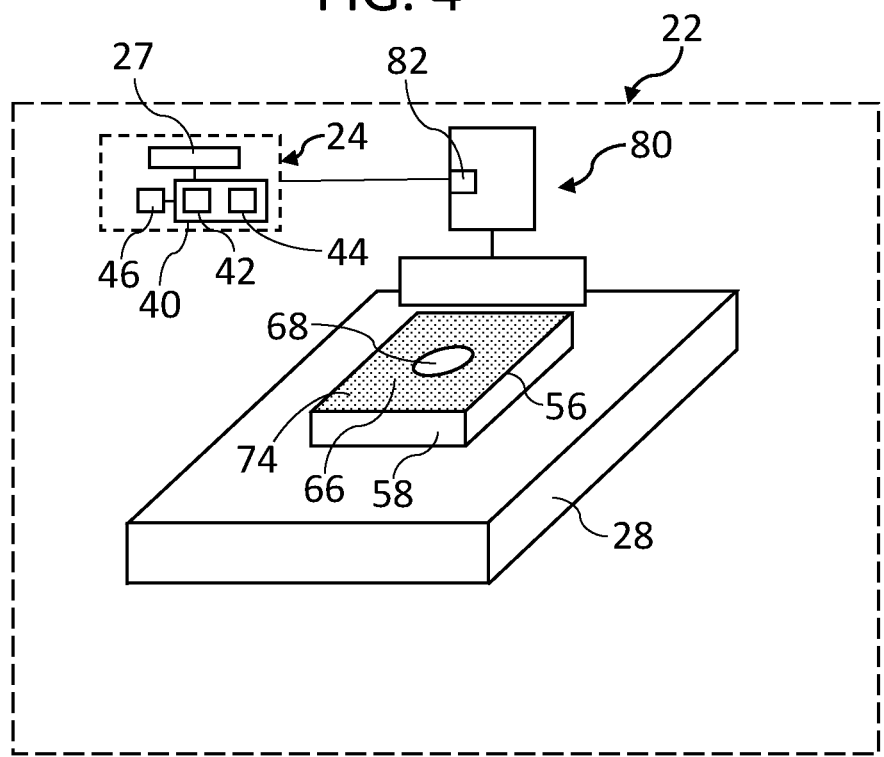
FIG. 5 is a schematic illustration of an additive manufacturing system at an excess powder removal stage in the process of building a product, in accordance with various embodiments.

In FIG. 5, a sweeper 80 is shown removing excess powder 74 from the product 58 being built. The sweeper 80 may be operated after each layer of powder 74 is applied to a sheet of the feedstock 30. The sweeper 80 operates to remove powder 74 not adhered by the printing material 66 and may be a device such as an air device or a mechanical device. For example, the sweeper 80 may be a vacuum, a blower, a brush, a scraper, or a combination thereof. The sweeper 80 includes actuators 82, which may be part of the actuators 26. The actuators 82 may include multi-axis positioning devices, valves, pumps, etc. The controller 40, via the processor 42, operates the actuators 82 to remove loose powder 74 from the sheet 56. In particular, any powder dropped on the area 68 is removed since no printing material was applied to there. As shown in FIG. 5, the powder 74 remains adhered by the printing material 66, except in the area 68 where no printing material 66 was applied.

Figure 6:
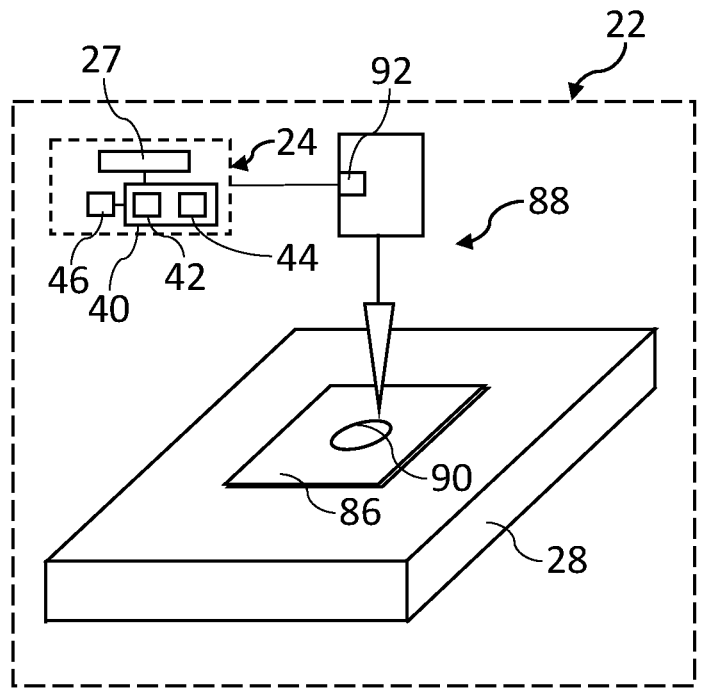
FIG. 6 is a schematic illustration of an additive manufacturing system at a cutting/forming stage in the process of building a product, in accordance with various embodiments.
Figure 7:
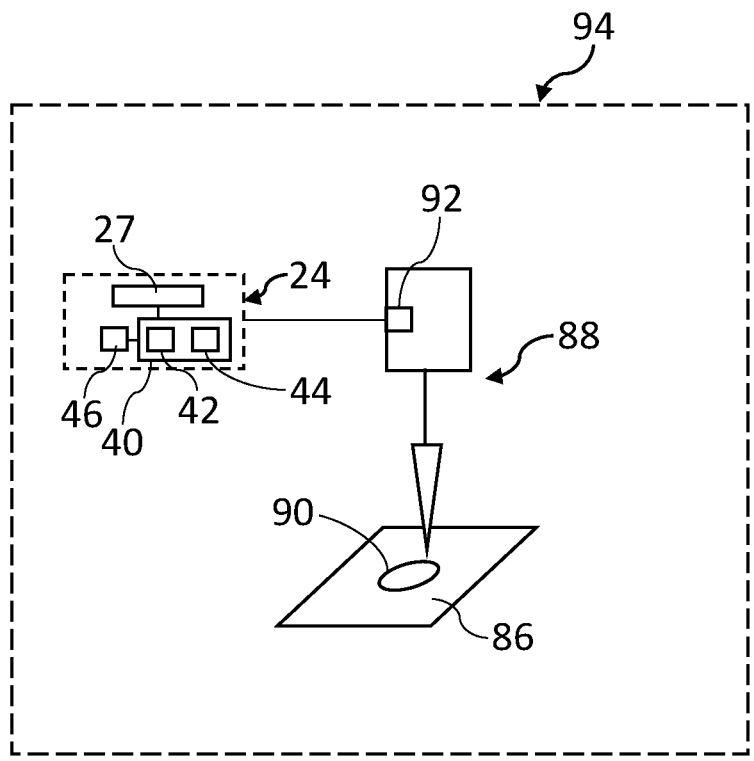
FIG. 7 is a schematic illustration of an additive manufacturing system at an alternate cutting/forming stage in the process of building a product, in accordance with various embodiments.

Referring to FIGS. 6 and 7 alternate embodiments for cutting the next sheet 86 of the sheets 32 to be added to the product 58 being built in the additive manufacturing cell 22. As shown in FIG. 6, the sheet 86 may be delivered and placed on the build plate 28 on top of the sheet 56 prior to being cut. A cutter 88 may be operated to trim any areas of the sheet 86 that coincide with the math data defined location of openings for this layer of the product 58. In this example, the sheet 86 has an opening 90 through the sheet 86. The opening is the beginning of building a hollow volume within the product 58 that is a space that is unfilled by the sheets 32. The opening 90 coincides with the area 68 of FIG. 4 where no printing material 66 was applied and of FIG. 5 where the powder 74 did not adhere. The cutter 88 may be any device suitable for cutting through the sheet 86. Examples include lasers, liquid jet cutters, and mechanical cutters such as knives and stamps. The cutter 88 includes actuators 92, which may be part of the actuators 26. The actuators 92 may include a multi-axis positioning device, an energy delivery device, an aiming device to operate the cutter to remove a section or sections of the sheet 86. The controller 40, via the processor 42, operates the actuators 92 to selectively pierce the sheet 86 to form the opening 90, and any other openings that may be at a respective layer/sheet of the product 58.

Figure 8:
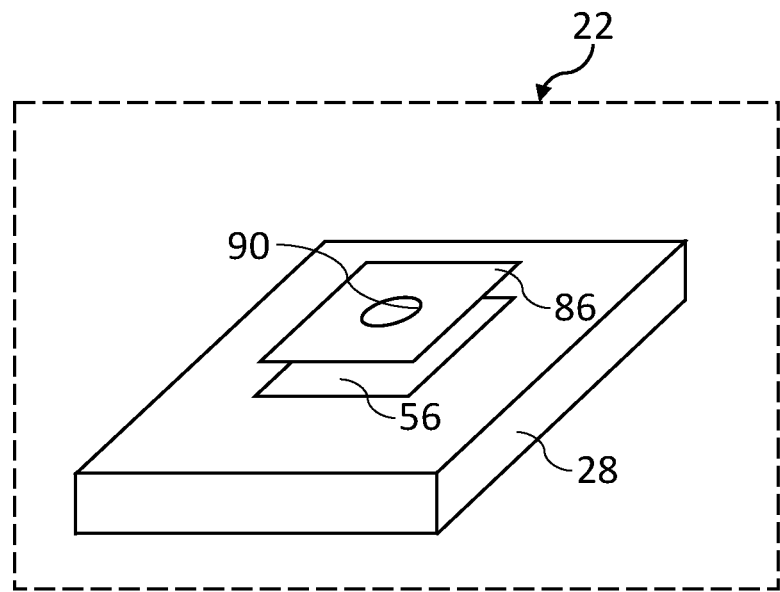
FIG. 8 is a schematic illustration of an additive manufacturing system at a layer application stage in the process of building a product, in accordance with various embodiments.

FIG. 7 illustrates an alternate embodiment where the sheet 86 is cut outside the additive manufacturing cell 22. The cutter 88, may be operated by the controller 40, or by a separate controller, in a workstation 94. In the workstation 94, the sheet 86 may be precut and placed in build order in a stack of the feedstock 30, or may be cut directly before being added into the build. FIG. 8 illustrates the sheet 86, in a precut state, being added to the build over the sheet 56 on the build plate 28. The opening 90 aligns with the area 68.

Figure 9:
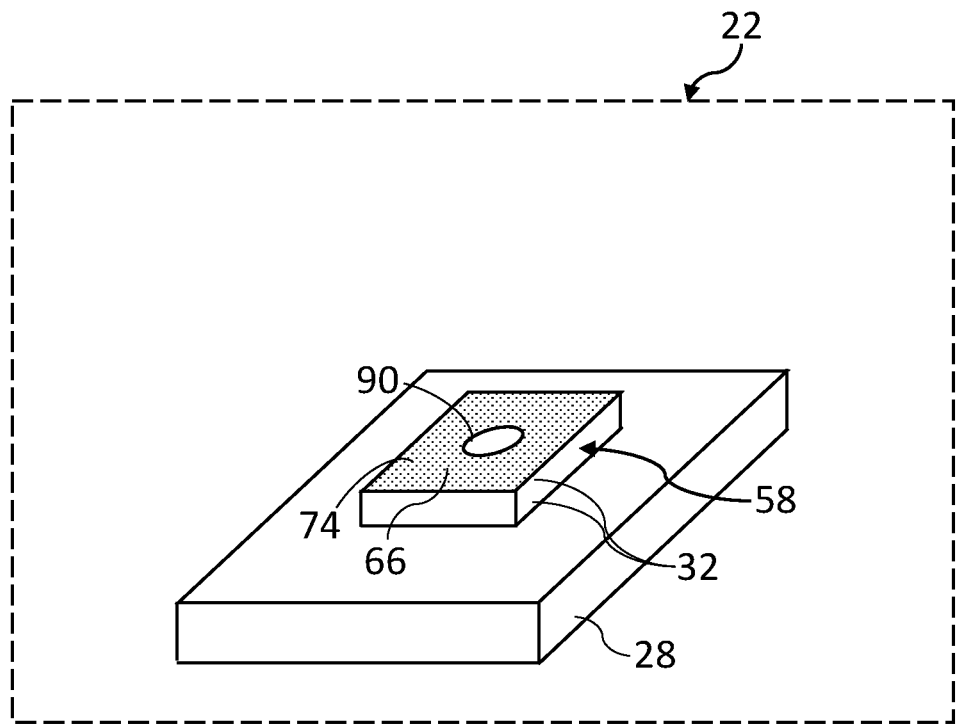
FIG. 9 is a schematic diagram of an additive manufacturing system at a prepared for a new layer/sheet application stage in the process of building a product, in accordance with various embodiments.

Referring to FIG. 9, a number of layers of the product 58 have been successively built up with a number of sheets 32 of the feedstock 30 with printing material 66 and powder 74 added between each pair of sheets 32 and cutting performed as needed on the sheet 32. The opening 90 extends through plural of the sheets 32. As the layers, with one of the sheets 32 per layer are added, no support is required in the opening 90 to support the next layer that will cover the opening 90 since the feedstock is sufficiently rigid to support higher layers. At this point the opening 90 will next be closed by the addition of the next sheet, which is added after printing material 66 and powder 74 are added.

Figure 10:
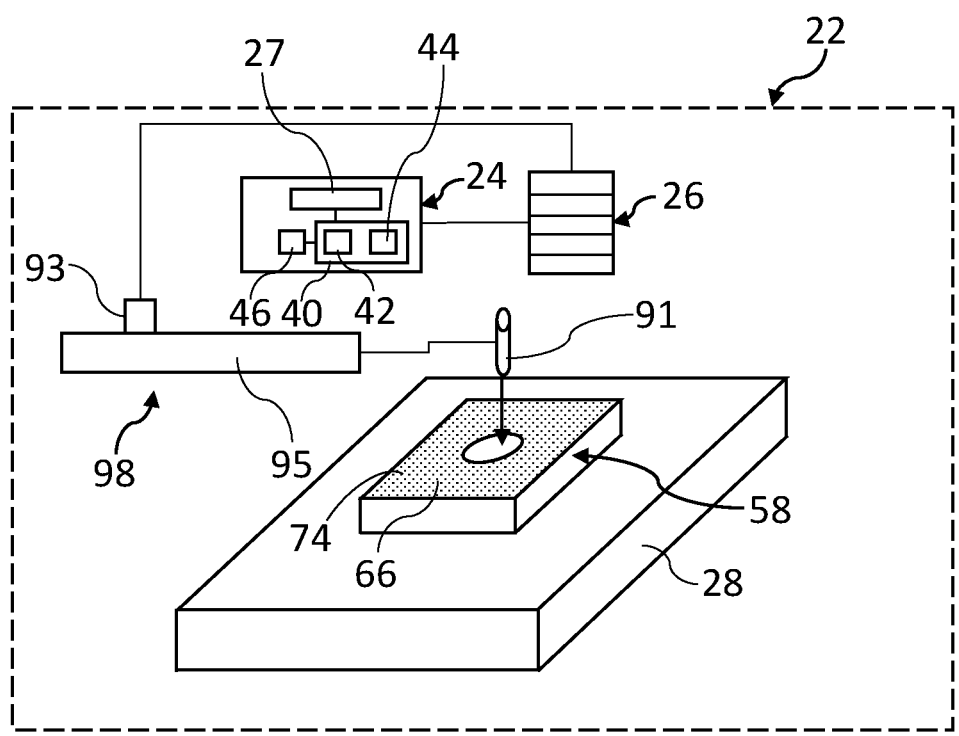
FIG. 10 is a schematic illustration of an additive manufacturing system at an object/fluid insertion stage in the process of building a product, in accordance with various embodiments.

In some embodiments, a fluid or on object may be added into the opening prior to adding the sealing layer of the next sheet over the opening 90. For example, as shown in FIG. 10, an insertion system 98 may be employed to automatically insert an object/fluid 91. An actuator 93, or multiple actuators, may be employed to move the object/fluid 91 via a conveying mechanism 95. The actuator(s) 93 may be part of the actuators 26. In examples, the actuator(s) may include those that operate conveyor(s), conduits, pick-and-place machines, robotic arms, and/or other material moving devices as the conveying mechanism 95.

Figure 11:
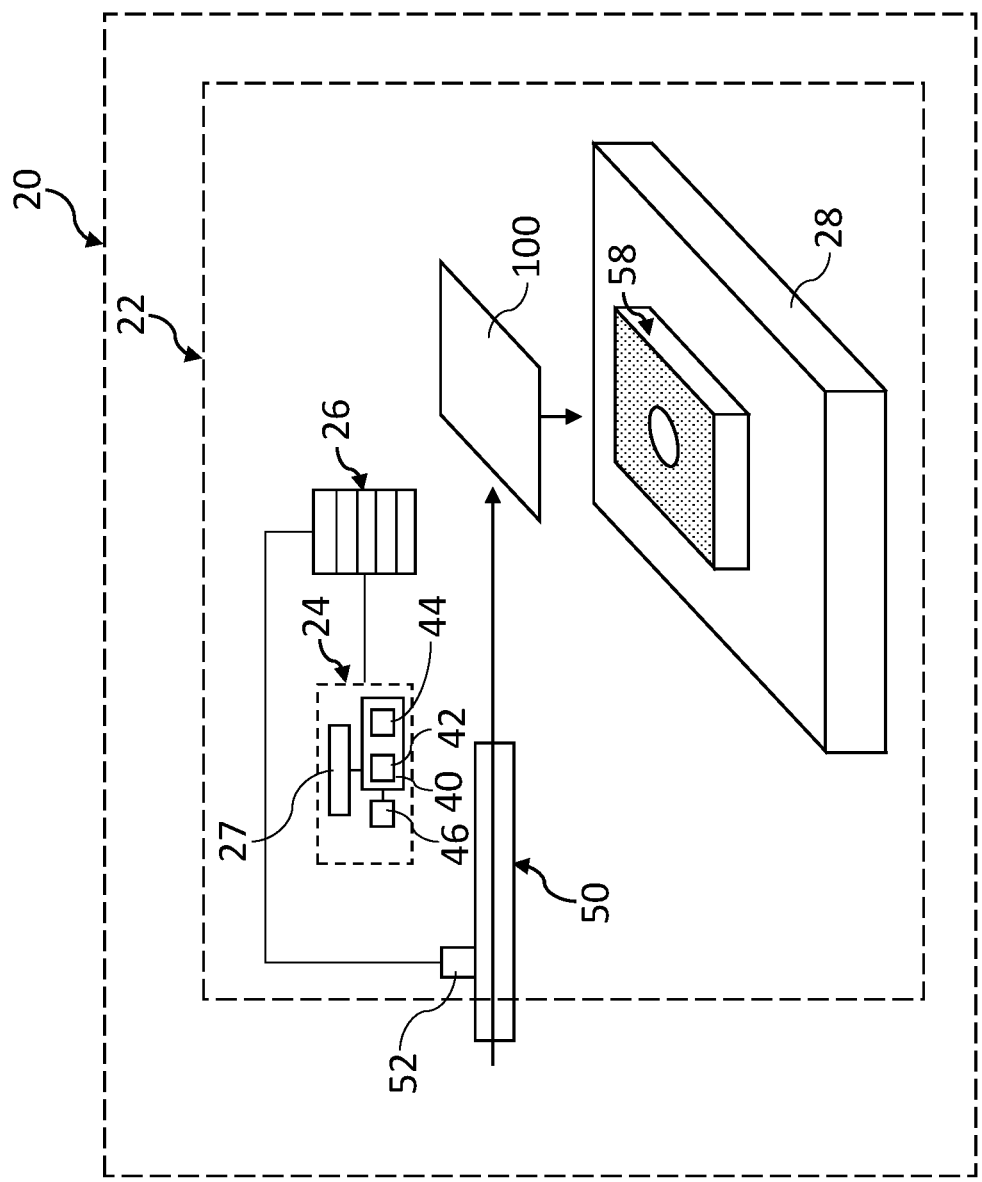
FIG. 11 is a schematic illustration of an additive manufacturing system at an object/fluid insertion stage in the process of building a product, in accordance with various embodiments.
Figure 12:
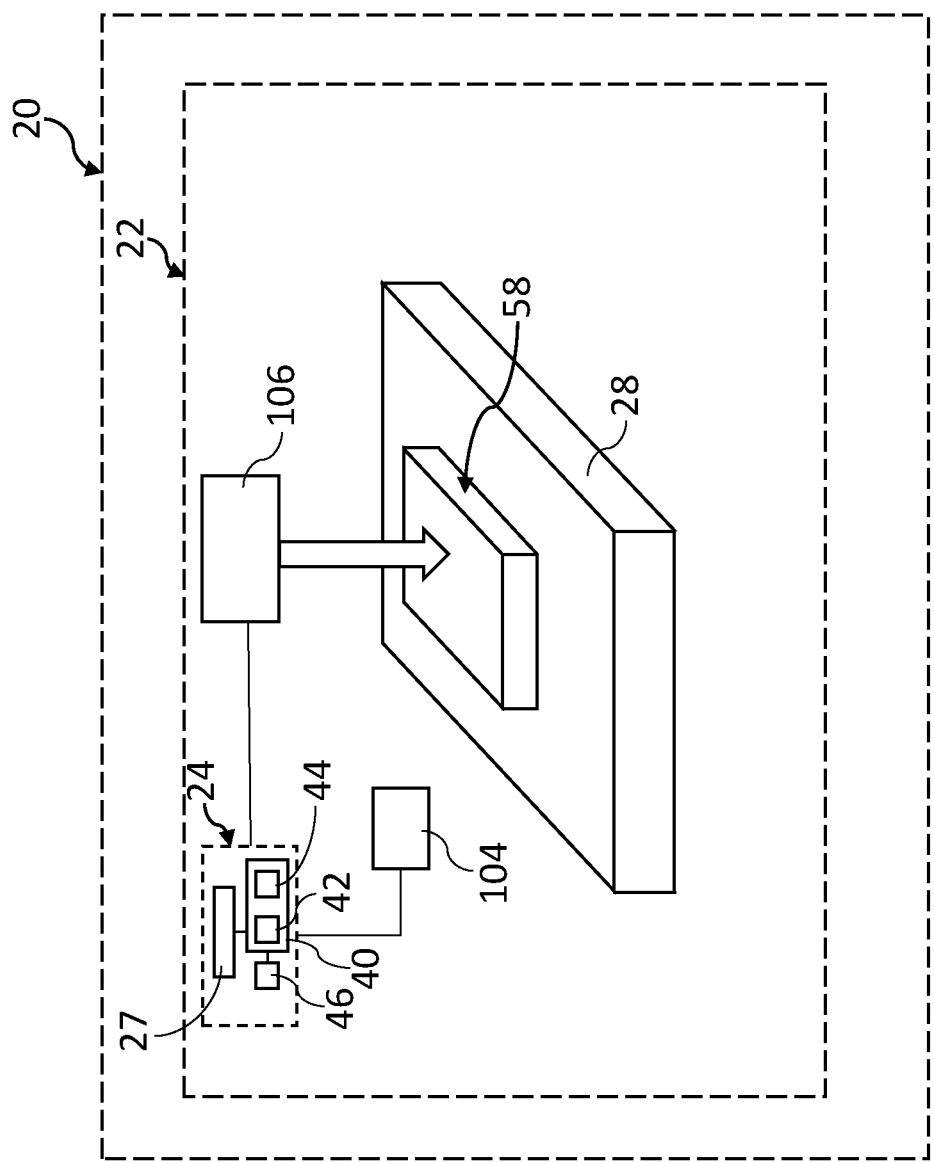
FIG. 12 is a schematic illustration of an additive manufacturing system at a sintering stage in the process of building a product, in accordance with various embodiments.

The sheet 100, which is the last of the sheets 32 via the feed system 50, is added to the product 58 in FIG. 11, which completes the buildup of layers. The opening 90 becomes a cavity that is fully enclosed and disposed entirely within the product 58 with material of the product 58 completely surrounding the opening 90. The opening 90 may be a hollow volume or may contain the object/fluid 91. Because no supports were added during the build, none require removal from the non-accessible opening 90. In addition, due to operation of the sweeper 80, no loose material was left in the sealed opening during the build. Actuators 26, operated by the controller 40, in the form of a heater 104 and a cylinder 106 may be included to apply heat and pressure to the product 58 as shown in FIG. 12 to consolidate the sheets 32 into a unified contiguous product 58. In some embodiments, the consolidation may be carried out in a separate workstation (not shown), with the product 58 or the product 58 and the build plate 28 moving to that other workstation.

Figure 13:
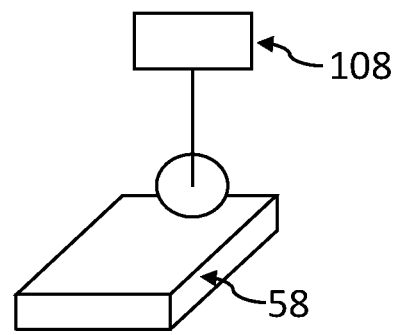
FIG. 13 is a schematic illustration of an additive manufacturing system at a post processing stage in the process of building a product, in accordance with various embodiments.

The built-up product 58 may be removed from the additive manufacturing cell 22 or the other workstation, and post build processes may be carried out as illustrated in FIG. 13. For example, a machine 108 may be used for purposes such as to finish the outside surface of the product 58, to make accommodations for coupling to openings, to make connections with other parts, etc. The machine 108 may be a grinding machine, a polishing machine, a boring machine, a blasting machine, or others.

Figure 14:
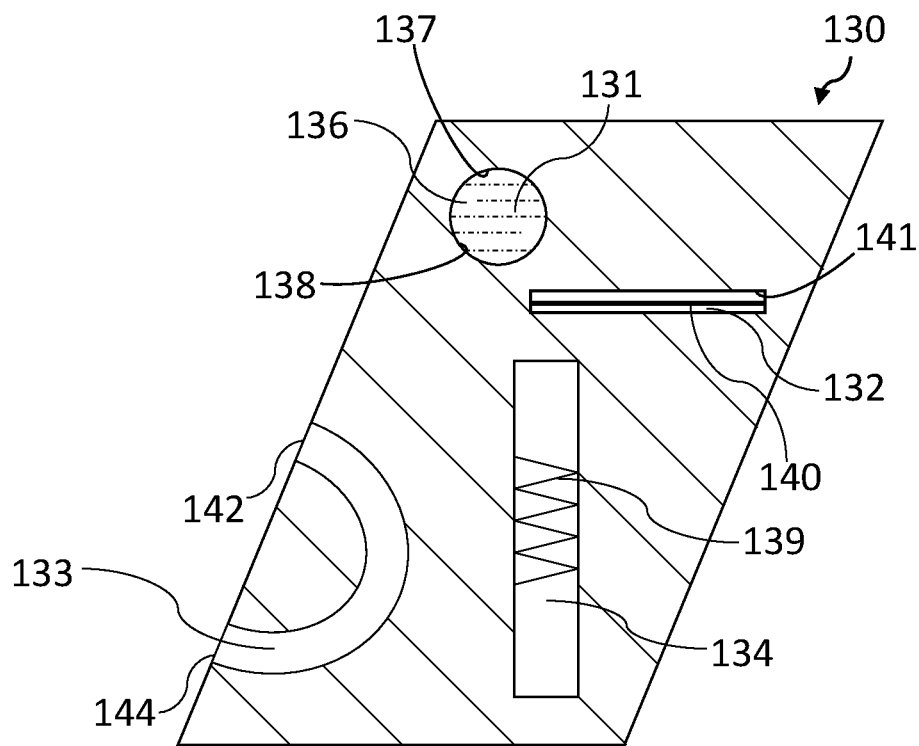
FIG. 14 is a cross sectional illustration of a product produced by the additive manufacturing system of FIGS. 1-13 with various features, in accordance with various embodiments.

As shown in FIG. 14, a product 130 after being built, such as by the system 20, is shown schematically in a sectional view. The product 130 may be a complete item or a part of a machine, a system, or another item of manufacture. The product 130 has an outer surface 128 that defines all sides of the product 130. Multiple cavities 131, 132, 133 and 134 are formed within the product 130 as examples of voids/hollow volumes.

The cavity 131 is configured as a conduit that extends along the direction of view and may connect internal features (not shown) of the product 130. As such, the cavity 131 is fully enclosed and disposed entirely within the product 130 and sealed with material of the product 130 completely surrounding the cavity 131. The cavity 131 may contain a fluid 136, such as a liquid or gas, that may be added prior to completion of the sealing layer(s) at its top 138 of the cavity 131 during the build. In embodiments, during the build and prior to closing off the cavity 131 with subsequent layers, it may be lined with a sealing layer 137, such as a sealant or tubing lining, to provide a sealing solution for isolation of the product 130 from the fluid 136 contained in, or passing through, the cavity 131 during use.

The cavity 132 is configured as an internal compartment that contains embedded electronic device 140, such as a sensor, RFID chip, transceiver, or other device. The cavity 132 is also fully enclosed and disposed entirely within the product 130 and sealed with material of the product 130 completely surrounding the cavity 132. The electronic device 140 may be coupled with external components through an embedded wire (not shown) or wirelessly. The electronic device 140 may be inserted by the insertion system 98 prior to adding the layers/sheets at the top 141 of the cavity 132.

The cavity 133 is a conduit that extends through a part of the product 130 and includes openings 142, 144 through the surface 128. The openings 142, 144 are provided for coupling the cavity 133 with an external conduit network (not shown). Other than the openings 142, 144 through the surface 128, the cavity 133 is closed within the product 130.

The cavity 134 is an open space/hollow volume inside the product 130 for a frame structure 139. The frame structure 139 may be created inside the cavity 134 during the build by selective cutting of the sheets 32 and by selecting a compatible build orientation. The frame structure 139 may be designed and configured to deliver desirable mechanical properties and may be sealed inside the cavity 134. In some embodiments, the frame structure 139 may be created in a honeycomb or lattice configuration. The frame structure 139, along with material selection of the sheets 32, may be configured to provide targeted stiff and flexible properties to different areas within the product 130. The options may be expanded by using sheets 32 made of different materials or sheets 32 that have a variety of materials with different properties in each single sheet 32. Employing different materials when creating internal frame structure 139 and other areas of the product 130 enables, for example, creating an internal skeleton (frame structure 139) that is stiff like bones and an external skin (surface 128) that is flexible, or in other embodiments, a flexible exterior with a rigid interior.

The product 130 is illustrated in FIG. 14 in an as-built state without any post-processing. The cavities 131-134 are all free of internal build supports that might otherwise be entombed or trapped in the product 130. The cavity 134 has the internal structures 139 that are intended to stay in the product 130. The cavities 131-134 are built in their final state after leaving the additive manufacturing cell, other than connections at the openings 142, 144. The cavities 131-134 are also free of any extraneous materials and are shaped to their final design specifications and geometries without irregularities.

Figure 15:
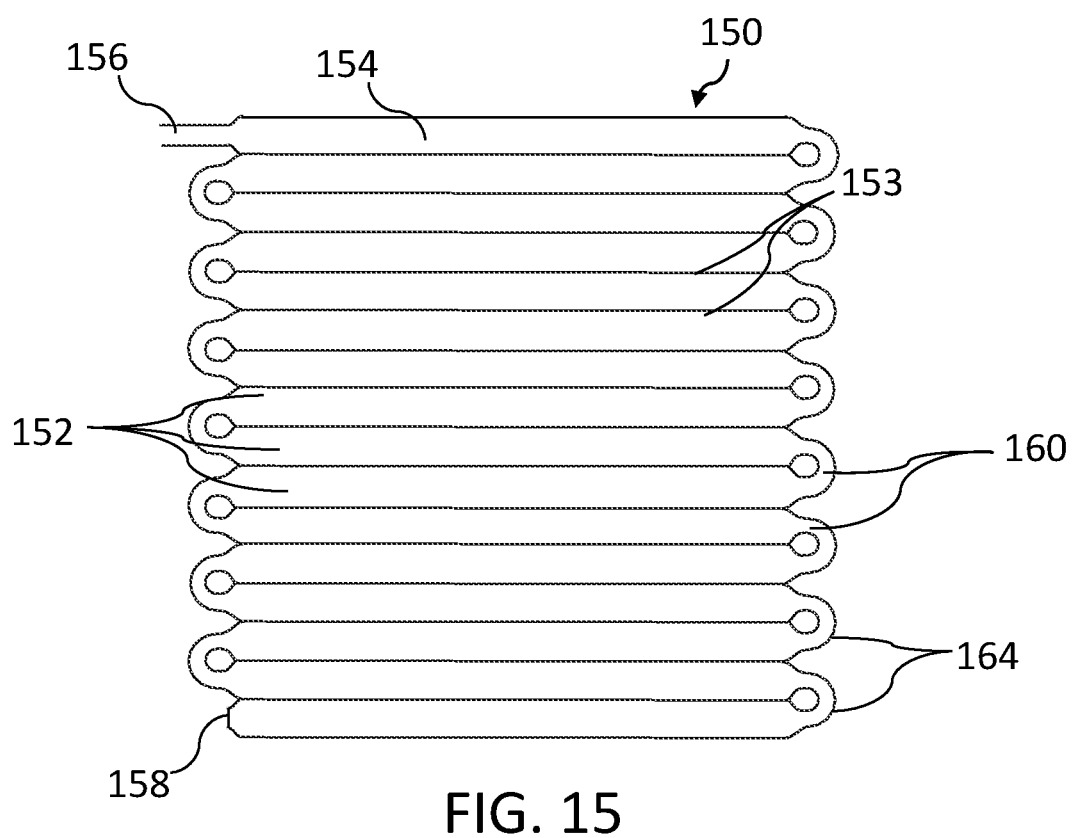
FIG. 15 is a cross sectional illustration of a storage vessel product produced by the additive manufacturing system of FIGS. 1-13, in accordance with various embodiments.

Referring to FIG. 15, a product 150, after being built by the system 20, is schematically illustrated in cross section. The product 150 is a conformable tank, which is a storage vessel that departs from a simple cylindrical shape to conform to, and fit in, available space, such as of a vehicle. A variety of design techniques may be used to fit the space, such as serpentine, spiral, cell stacking, banking, and additional approaches. In the current embodiment, the product 150 is formed in a serpentine configuration. The product 150 may be employed to receive, store and deliver a fuel, which may be gas or a liquid.

The product 150 is segmented with a number of cells 152 that are connected in series. In other embodiments, the connection may be of another configuration. In the current example there are sixteen cells 152. The cells 152 are closed by walls 153 defining cavities 154 suitable for contained storage. One cell 152 may form a first segment of the product 150, and may include an opening 156 to the product 150. In other embodiments more than one opening may be provided to the cavities 154. Interconnected segments of the product may include a number of the cells 152 that fits in the available space. Each of the cells 152 may be completely open in its interior and all the cavities 154 are connected with each other through a serpentine path. As a result, a gas entering the opening 156 must pass through each and every one of the cells 152 to reach the end 158. Each of the cells 152 may be individual storage vessels connected to the adjacent vessel(s) in the series chain by connecting conduits 160 as open paths defined by walls 164. The cavities 154 and the conduits 160 define one contiguous and sealed hollow volume/open space. The cells 152 may be physically arranged in a package that may be tailored to fit within the available design space of the application.

The walls 153 that define the cells 152 and the walls 164 that define the conduits are formed by the system 20 and after build comprise a unified structure via sheets 32 of the feedstock 30 that are integrated together. The sheets used to build the product 150 may be made with desirable surface qualities for defining the surfaces that face the stored substance. For example, triply periodic minimal surfaces may be provided. The opening 156 may be formed during the build or may be cut afterward in post-processing. In the current embodiment, the sheets used to build the product 150 are made of a material selected to provide desired properties. For example, a polymer matrix and long strand fiber (such as carbon) reinforcement may be used. In addition, cell 152 size, wall thickness, and other physical properties of the product 150 may be tuned to result in a low permeable, light weight, high packing density storage vessel.

Figure 16:
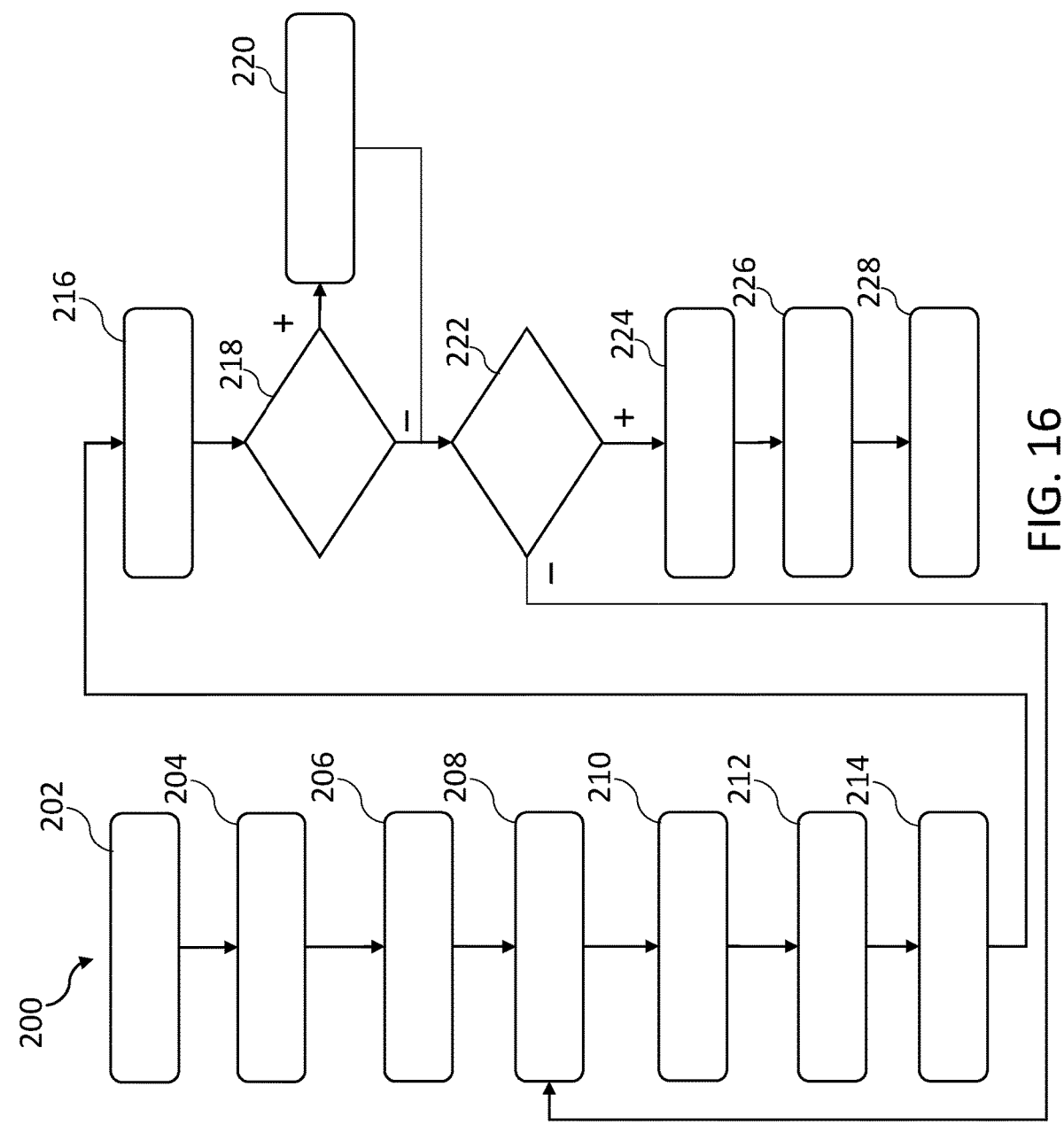
FIG. 16 is a process that uses the additive manufacturing system of FIGS. 1-13, in accordance with various embodiments.

A process 200 for producing products, such as the products 130, 150 using a system, such as the system 20, is illustrated in FIG. 16 in flow chart form. As will be appreciated in light of this disclosure, the order of operations within the process 200 is not limited to the sequential execution as illustrated in FIG. 16, and may be performed in one or more varying orders as applicable and in accordance with the present disclosure. In additional embodiments, additional steps may be included in the process 200 and/or some steps may be omitted from the process 200.

The process 200 begins with designing 202 the product. The system 20 provides the flexibility to integrate features such as internal three-dimensional open spaces such as hollow volumes, voids, channels, conduits and cavities that may be sealed closed or that may have openings. The product design may be defined by design (math) data which defines the physical geometry of the product by three dimensional coordinates produced by a computer using commercially available design (CAD) software. The product is specified 204, creating a specification which may include detailing physical properties of the product and the materials used. For example, the materials from which the feedstock 30 is made and the thickness and size of the sheets 32 is specified 204. Whether plural materials are required, either within a sheet or between different sheets, is specified 204. In addition, the material used as the printing material 66 and as the powder 74 is specified 204, as is whether any substances and/or objects are embedded in the product.

Using the CAD system, the design data is sectioned 206, where a plurality of data sets of the product design 202 as specified 204 are produced at slices/intervals that coincide with the thickness of the layers of the product built by the sheets 32. At each sectioned 206 interval, the outline of the section and any internal openings, such as the opening 90, are defined. The feedstock, such as the feedstock 30, made per the specification 204, is cut 208 into sheets 32 of the desired profile/perimeter matching the outline of the product at each respective sheet's location in the build order. The cutting 208 may include forming any internal openings in the sheet, or doing so may be carried out later, such as in-situ in the additive manufacturing cell 22. The cutting 208 may be performed using a device such as the cutter 88. The cutting 208 of the sheets may be done with a laser, water-jet, blade, stamp, or other cutting tool as the cutter 208. In embodiments, the sheets 32 may be cut one at a time as used in the build, or may be cut and stacked in their build order prior to starting the build.

The cut 208 sheets are fed 210 into the additive manufacturing cell 22 one at a time, such as by a material handling machine, for example the feed system 50 with the actuator 52 as controlled by the controller 40. As part of the feed 210, the respective sheet 32 is positioned on the build plate 28. A material, such as the printing material 66 is printed 212 onto the sheet 32 on the build plate 28. For example, the jet system 64 as operated by the controller 40 prints 212 the printing material 66 on select areas of the sheet 32 on top of the build. For example, the math data of the sheet as cut 208, may define the print area, which data may be stored and retrieved by the processor 42 from the storage device 46. The areas of any cavities/openings may be avoided by the printing 212, such as the area 68 of the sheet 56.

The process 200 continues with application 214 of a material for securing the sheets 32 together, such as by bonding, surface diffusion, or fusing. For example, the powder delivery system 72, as operated via the controller 40 through the actuators 76, may apply the powder 74 to the same area to which the printing material 66 was applied. The printing material 66 captures and holds the powder 74 on the desired areas of the respective sheet. Any excess powder 74 may be removed 216, such as by the sweeper 80 operated by the controller 40 via the actuators 82.

Following the removal 216, a determination 218 is made as to whether the insertion of a substance or an object into a cavity is specified 204 at the layer. For example, the controller 40 may reference the build routine from the storage device 46 for the product being built for details of the operations required for the layer being built. When the determination is positive, and a substance or object is specified for insertion, the process 200 proceeds to add 220 the substance or object. For example, the specification 204 may include a substance, such as a fluid, and/or an embedded object, such as battery materials, metal, active pharmaceuticals, lights, RFID chips, cameras, antennas, magnets, conductors, a combination thereof, or others. As the build continues, the substance/object may be entombed/encased within the product by higher layers/sheets 32. The substance or object may be added 220 under operation of a device, similar to the insertion system 98, which may be operated by the controller 40. In some embodiments, the object/substance may be added 220 by a separate mechanism, such as by a machine or manually.

When the determination 218 is negative, meaning no substance/object is specified for insertion, or when the addition 220 is complete, the process 200 proceeds to determine 222 whether the build of the product is complete. When the determination 222 is negative, meaning the build is not compete, the process returns to repeat steps 208 through 222. In embodiments where the sheets 32 of the feedstock 30 are fully pre-cut, the process 200 may return and repeat steps 210 through 222.

When the determination is positive, meaning the build routine is complete and the full height of the product is built-up, the process 200 proceeds to consolidation 224 of the sheets which define the product into a unified structure. For example, the stack of sheets 32 with intermediate powder 74 and printing material 66 (at each layer) may be given time to set, or may be cured, sintered, heated, pressurized, pressed, and/or subjected to various forms of energy and/or force. The consolidation 224 may be carried out in the additive manufacturing cell 22 or the built-up product may be transported to a different machine/environment for the consolidation 224. In a specific example, the product may be subjected to heat and pressure and sintered. Following the consolidation 224, any post processing 226 may be carried out and the process 200 may then end 228. For example, post processing 226 may involve machining and/or cleaning.

Through the embodiments disclosed herein, products may be built by additive manufacturing forming voids/hollow volumes without internal support or post build material removal from the internal voids of the built-up product. Substances and/or objects may be embedded in the product and complex shapes and designs may be readily created. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A method of building a product from sheets, the method comprising:

feeding, by at least one actuator, one of the sheets into an additive manufacturing cell;

printing, by a printer, a printing material onto the one of the sheets;

applying, over the printing material, a powder for securing the sheets together;

building the product by repeating the feeding, the printing, and the applying for remaining of the sheets except for a last one of the sheets where only the feeding is repeated;

forming, by the building, a hollow volume within the product, without build supports extending through the hollow volume;

determining, by a controller and during the building, when insertion of a substance or an object into the hollow volume is specified at a layer of the building and prior to closing the hollow volume;

closing, by the building and with one of the sheets, the hollow volume, including after the insertion when specified;

completing the building by feeding the one last sheet without the printing and without the applying; and consolidating, by securing via an energy source and the powder, the sheets together to define the product as a contiguous structure.

2. The method of claim 1, comprising sectioning, before the feeding, design data of the product at intervals through the product to produce a plurality of data sets, each data set in the plurality of data sets defining a section of the product, and all of the plurality of data sets defining the product, in entirety.

3. The method of claim 1, comprising:

sectioning design data of the product at intervals through the product to produce a plurality of data sets, each data set in the plurality of data sets defining a section of the product, and all of the plurality of data sets defining the product, in entirety; and cutting, by a cutter and before the feeding, the sheets to match the plurality of data sets including cutting openings through some but not all of the sheets, including cutting one sheet in the sheets for each one of the plurality of data sets.

4. The method of claim 1, comprising:

forming the hollow volume as a series of cavities and conduits interconnecting the cavities, wherein the cavities and the conduits define one contiguous and sealed open space.

5. The method of claim 1, comprising constructing the hollow volume out of the sheets as a conduit for conveying a fluid through the product; and forming the sheets with openings to the conduit for coupling purposes.

6. The method of claim 5, comprising:

forming the internal frame structure from a first material having a first rigidity; and forming an area of the sheets other than the internal frame structure from a second material having a second rigidity, wherein the first rigidity is different than the second rigidity, wherein the internal frame structure is configured to remain in the product and to support the second material during flexing.

7. The method of claim 1, comprising forming the hollow volume as a series of cavities and conduits interconnecting the cavities; and constructing the sheets used to build the product with surfaces that face into the hollow volume with surface characteristics including a permeability tailored to a substance the cavities are configured to contain.

8. The method of claim 1, comprising:

cutting the sheets to match a plurality of data sets; and
stacking, after the cutting and prior to the feeding, the sheets in a build order.

9. The method of claim 1, comprising lining, during the building and prior to closing off the hollow volume with subsequent sheets, the hollow volume with a sealing layer to provide isolation of the product from a fluid in the hollow volume.

10. The method of claim 1, comprising cleaning the hollow volume by a sweeper after application of each sheet of the sheets to remove the powder from the hollow volume.

11. A system for building a product from sheets, the system comprising:

at least one actuator configured to feed one of the sheets into an additive manufacturing cell;

a printer configured to print a printing material onto the one of the sheets, at least one of a scraper, a roller, a chute and a nozzle configured to apply, over the printing material, a powder for securing the sheets together, wherein the at least one actuator, and the printer are configured to build the product from remaining of the sheets except for a last one of the sheets where no printing material and no powder is included, wherein the additive manufacturing cell configured to build a hollow volume within the product, without supports for the sheets extending through the hollow volume, and to complete the build with the one last sheet;

a controller configured to determine during the building, when insertion of a substance or an object into the hollow volume is specified at a layer of the building and prior to closing the hollow volume;

wherein the additive manufacturing cell is configured to close, with one of the sheets, the hollow volume, including after the insertion when specified; and comprising an energy source configured to secure, via the powder, the sheets together to define the product as a contiguous structure.

12. The system of claim 11, comprising a computer configured to generate design data of the product at intervals through the product to produce a plurality of data sets, each data set in the plurality of data sets defining a section of the product, and all of the plurality of data sets defining the product, in entirety.

13. The system of claim 11, comprising:

a computer configured to section design data of the product at intervals through the product to produce a plurality of data sets, each data set in the plurality of data sets defining a section of the product, and all of the plurality of data sets defining the product, in entirety; and a cutter configured to cut the sheets to match the plurality of data sets including with openings through some but not all of the sheets, wherein there is one sheet in the sheets for each one of the plurality of data sets.

14. The system of claim 11, wherein the hollow volume comprises a series of cavities and conduits interconnecting the cavities, wherein the cavities and the conduits define one contiguous and sealed open space.

15. The system of claim 11, wherein the sheets define the hollow volume as a conduit for conveying a fluid through the product, and the sheets define openings to the conduit for coupling purposes.

16. The system of claim 15, wherein:

the internal frame structure comprises a first material having a first rigidity, an area of the sheets other than the internal frame structure comprises a second material having a second rigidity, and the first rigidity is different than the second rigidity, wherein the internal frame structure is configured to remain in the product and to support the second material during flexing.

17. The system of claim 11, wherein the hollow volume comprises a series of cavities and conduits interconnecting the cavities, and wherein the sheets used to build the product include surfaces that face into the hollow volume that have surface characteristics including a permeability tailored to a substance the cavities are configured to contain.

18. The system of claim 11, comprising:
a cutter configured to cut the sheets to match the plurality of data sets, wherein the sheets comprise a stack, pre-stacked in a build order before being fed into the additive manufacturing cell.

19. The system of claim 11, comprising lining, during the building and prior to closing off the hollow volume with subsequent sheets, the hollow volume with a sealing layer to provide isolation of the product from a fluid in the hollow volume.

20. A method of building a product from sheets, the method comprising:
sectioning design data of the product at intervals through the product to produce a plurality of data sets, each data set in the plurality of data sets defining a section of the product, and all of the plurality of data sets defining the product, in entirety;
cutting, by a cutter and before the feeding, the sheets to match the plurality of data sets including cutting openings through some but not all of the sheets, including cutting one sheet in the sheets for each one of the plurality of data sets;
feeding, by an actuator, one of the sheets into an additive manufacturing cell;
printing, by a printer, a printing material onto the one of the sheets;
applying, by a material delivery system and over the printing material, a powder for securing the sheets together;
building the product by repeating the feeding, the printing, and the applying for remaining of the sheets except for a last one of the sheets where only the feeding is repeated;
forming, by the building, a hollow volume within the product, without building supports for the sheets that extend through the hollow volume;
shaping, by the building, the hollow volume into a series of storage cells interconnected by conduits and including a compartment;
determining, by a controller and during the building, when insertion of a substance or an object into the hollow volume or the compartment is specified at a layer of the building and prior to closing the hollow volume;
inserting at least one sensor into the compartment;
closing, by the building and with one of the sheets, the hollow volume, including after the insertion of the at least one sensor when specified, embedding the sensor in the product;
completing the building by feeding the one last sheet without the printing and the applying, wherein the hollow volume is sealed closed; and
consolidating, by securing via an energy source and the powder, the sheets together to define the product as a contiguous structure.

* * * * *